United States Patent [19]

Gou et al.

[11] Patent Number: 5,684,848
[45] Date of Patent: Nov. 4, 1997

[54] NUCLEAR REACTOR HEAT PIPE

[75] Inventors: Perng-Fei Gou, Saratoga; Larry Edgar Fennern, San Jose; Craig Delany Sawyer, Los Gatos, all of Calif.

[73] Assignee: General Electric Company, Schenectady, N.Y.

[21] Appl. No.: 643,802

[22] Filed: May 6, 1996

[51] Int. Cl.⁶ .................................. G21C 15/00
[52] U.S. Cl. ........................ 376/367; 165/104.26
[58] Field of Search ........................ 376/367, 298; 165/104.26, 272, 104.21

[56] References Cited

U.S. PATENT DOCUMENTS

| | | | |
|---|---|---|---|
| 3,681,843 | 8/1972 | Arcella et al. | 165/104.26 |
| 4,632,179 | 12/1986 | Meijer et al. | 165/104.26 |
| 4,903,761 | 2/1990 | Cima | 165/104.26 |
| 5,117,901 | 6/1992 | Cullimore | 165/104.26 |
| 5,253,702 | 10/1993 | Davidson et al. | 165/104.26 |

FOREIGN PATENT DOCUMENTS 52-15993   2/1977   Japan ...................... 376/367

*Primary Examiner*—Daniel D. Wasil
*Attorney, Agent, or Firm*—Armstrong, Teasdale, Schlafly & Davis

[57] ABSTRACT

A nuclear reactor including a heat pipe for transferring heat from the reactor pressure vessel to a steam supply vessel is described. More particularly, in one embodiment, the heat pipe includes an evaporator section positioned in the reactor vessel, a condenser section positioned in the steam supply vessel, and an adiabatic section extending between and in flow communication with the evaporator section and the condenser section. The adiabatic section of the heat pipe includes a substantially cylindrical outer sleeve and a substantially cylindrical inner sleeve. An annulus region is formed between the inner and outer sleeves and the annulus region is in flow communication with the steam supply vessel. An insulating layer covers an inner wall of the outer sleeve. A substantially annular wick member is positioned adjacent an inner wall of the inner sleeve, and a steam path is defined by an inner face of the wick member.

12 Claims, 3 Drawing Sheets

NUCLEAR REACTOR HEAT PIPE

FIELD OF THE INVENTION

This invention relates generally to nuclear reactors and, more particularly, to a nuclear reactor including a heat pipe for transferring heat from a reactor vessel to a steam supply system.

BACKGROUND OF THE INVENTION

Known boiling water nuclear reactors (BWRs) include a reactor pressure vessel (RPV) having a core of fuel bundles, steam separators, steam dryers and many other components positioned therein. The RPV generally is constructed from steel. In operation, water heated by the core vaporizes to form steam which is then processed through the steam separators and the steam dryers. The steam is then output from the RPV to main steam lines. Isolation valves control the delivery of steam through the main steam lines to a steam turbine. To replace the removed steam, water is supplied to the RPV by feedwater lines.

Known BWRs include open cooling systems in that water is vaporized to form steam in the RPV and the steam is delivered to main steam lines to a steam turbine external the RPV. Therefore, feedwater must be supplied to the RPV to replace the vaporized water and to maintain a sufficiently safe water level within the RPV. Main steam lines, feedwater lines and isolation valves are in flow communication with the RPV to perform these functions. Also, safety systems such as emergency core cooling systems typically are utilized to supply water to the RPV, for example, in the event of a loss of coolant accident.

It would be desirable to simplify the system and associated costs of known BWRs by eliminating, for example, steam separators and steam dryers. It also would be desirable to provide a closed RPV cooling system so that main steam lines, feedwater lines and isolation valves used in known BWRs can be eliminated.

SUMMARY OF THE INVENTION

These and other objects are attained by a nuclear reactor including a heat pipe for transferring heat from the RPV to an external steam supply system. The energy communication from the RPV to the steam supply system is through the heat pipe which is a closed device. Any postulated single break in the heat pipe will not open the path from the RPV to the outside environment.

In one embodiment, the heat pipe includes an evaporator section positioned in the RPV, a condenser section positioned outside the RPV, and an adiabatic section extending between and in flow communication with the evaporator section and the condenser section. The condenser section of the heat pipe is positioned in a steam supply vessel of the external steam supply system.

The adiabatic section of the heat pipe includes a substantially cylindrical outer, i.e., penetration, sleeve and a substantially cylindrical inner, i.e., heat pipe, sleeve. An annulus region, sometimes referred to as a water jacket, is formed between the inner and outer sleeves and the annulus region is in flow communication with the steam supply vessel. An inner wall of the penetration sleeve is covered with insulation to reduce heat loss. A substantially annular wick member is positioned adjacent an inner wall of the heat pipe sleeve, and a heat pipe steam path extends through a cylindrical opening defined by the inner face of the wick member.

In operation, heat from the reactor core causes the working fluid, e.g., water, in the evaporator section of the heat pipe to evaporate. The vapor flows in the heat pipe through the steam path to the heat pipe condenser section located in the steam supply vessel. The vapor condenses in the condenser section and the condensed fluid is transported, by gravity, primarily through the heat pipe wick, to the heat pipe evaporator section. The capillary action of the wick member facilitates transporting the condensed fluid from the condenser section to the evaporator section.

Heat energy transported to the heat pipe condenser section is transferred to the water in the steam supply vessel. The steam supply vessel water vaporizes and the generated steam is delivered to, for example, a steam turbine. Feedwater is supplied to the steam supply system vessel to replace the removed steam.

The water jacket of the heat pipe fills with water from the vessel of the steam supply system. Some heat energy flowing through the heat pipe also heats the water in the water jacket. The temperature in the RPV can be controlled by controlling the temperature of the water in the steam supply vessel. In addition, the heat pipe working fluid can be selected so that it boils and condenses at roughly the same temperature so that the temperature along the heat pipe is substantially uniform.

The above described heat pipe provides the advantage that no steam separator and no steam dryers are required in the RPV. In addition, since the RPV cooling system is closed, i.e., the primary coolant remains in the RPV, no main steam lines, no feedwater lines and no isolation valves are required in the RPV. Such a construction is believed to be much less complex than the constructions of known boiling water nuclear reactors. Further, by eliminating the isolation valves, the potential for leakage is reduced.

DETAILED DESCRIPTION OF THE DRAWINGS

Figure 1:
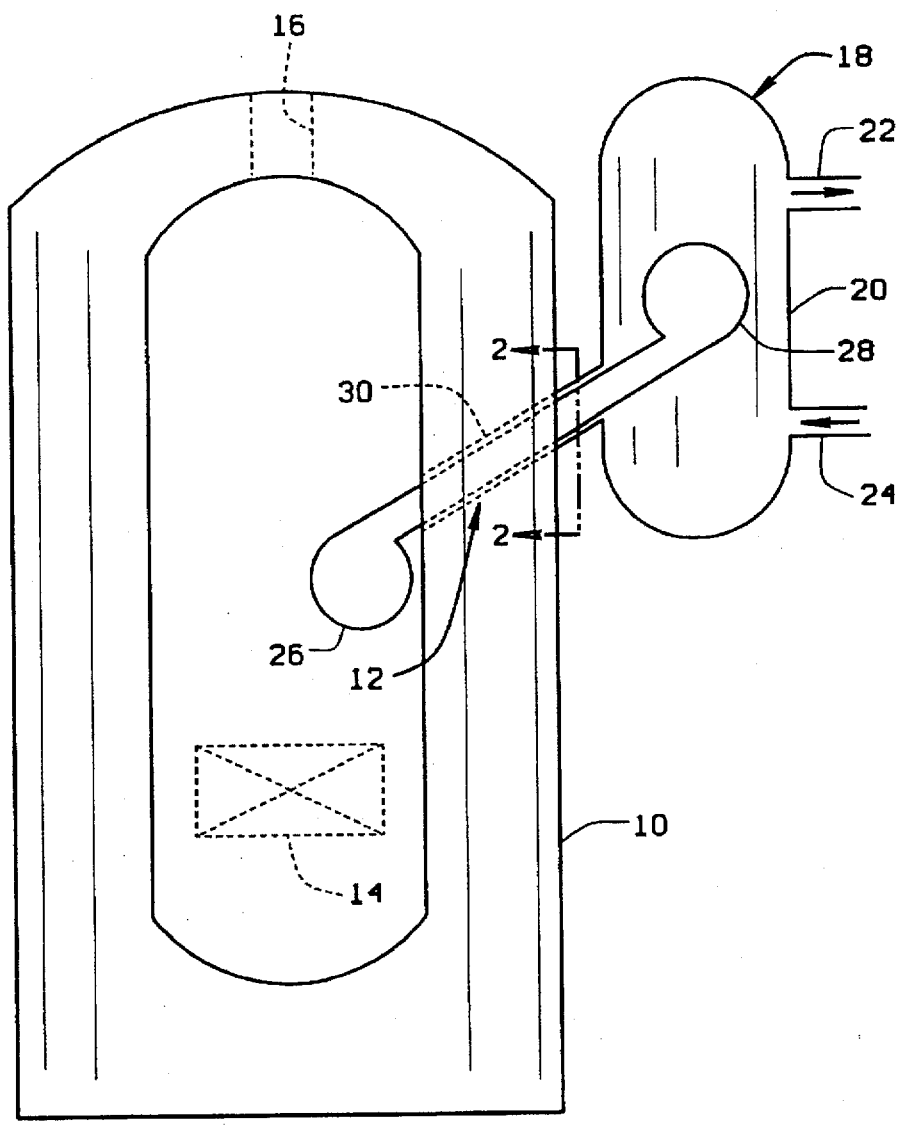
FIG. 1 is a schematic illustration of a nuclear reactor pressure vessel including a heat pipe in accordance with one embodiment of the present invention.

FIG. 1 is a schematic illustration of a nuclear reactor pressure vessel 10 including a heat pipe 12 in accordance with one embodiment of the present invention. Reactor pressure vessel 10 is formed from prestressed concrete and is sometimes referred to herein as a prestressed concrete reactor vessel (PCRV). A core 14 is located in vessel 10 and is composed of a plurality of fuel rods (not shown). Vessel 10 also includes a refueling port 16 to enable the removal and insertion of fuel rods into core 14.

A steam supply system 18 which includes a steam supply vessel 20 also is shown in FIG. 1. Steam is output from vessel 20 via a steam outlet 22. Feedwater is supplied to steam supply vessel 20 via a feedwater inlet 24. The steam from vessel 20 is delivered, for example, to a steam turbine for generating power.

Heat pipe 12 includes an evaporator section 26 positioned in reactor vessel 10, a condenser section 28 positioned in steam supply vessel 20, and an adiabatic section 30 extending between and in flow communication with evaporator section 26 and condenser section 28.

Figure 2:
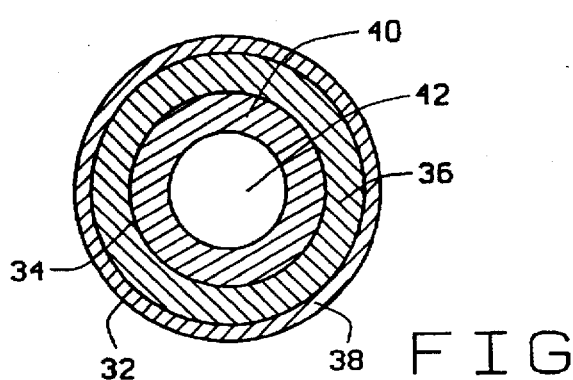
FIG. 2 is a cross section view through the adiabatic section of the heat pipe shown in FIG. 1.

FIG. 2 is a cross section through adiabatic section at line 2—2 shown in FIG. 1. As shown in FIG. 2, adiabatic section 30 of heat pipe 12 includes a substantially cylindrical outer, or penetration, sleeve 32 constructed, for example, from stainless steel. A substantially cylindrical inner, or heat pipe, sleeve 34, also constructed of stainless steel, is positioned proximate outer sleeve 32 and defines, with outer sleeve 32, annulus region 36. Annulus region 36 sometimes is referred to herein as a water jacket. Water jacket 36 is in flow communication with steam supply vessel 20 and extends from steam supply vessel 20 and the reactor vessel wall (FIG. 1). An insulation layer 38 covers the inner surface of penetration sleeve 32. A substantially annular wick member 40 is positioned adjacent on the inner surface of heat pipe sleeve 34. A steam path 42 is defined by the inner face of wick member 40.

In operation, heat from reactor core 14 causes the working fluid, e.g., water, in evaporator section 26 of heat pipe 12 to evaporate. The vapor flows through steam path 42 of adiabatic section 30 to condenser section 28 in steam supply system 18. The vapor condenses in condenser section 28 and the condensed fluid is transported, by gravity, through adiabatic section 30 to evaporator section 26. Specifically, the condensed fluid flows through wick member 40. The capillary action of wick member 40 facilitates transporting the condensed fluid from condenser section 28 to evaporator section 26.

The heat energy transported to condenser section 28 generates steam in steam supply system vessel 20. Specifically, as the vapor condenses in the condenser section 28, heat is transferred from heat pipe 30 to water in steam supply vessel 20. As a result of this heat transfer, water in steam supply vessel 20 vaporizes and the generated steam is delivered to, for example, a steam turbine via steam outlet 22. Feedwater is supplied to steam supply system vessel 20 via feedwater inlet 24 to replace the removed steam.

Water jacket 36 of heat pipe 12 is filled with water from vessel 20 of steam supply system 18. The temperature in reactor vessel 10 can therefore be controlled by controlling the temperature of the water in steam supply system 20. In addition, the heat pipe working fluid can be selected so that it boils and condenses at roughly the same temperature so that the temperature along heat pipe 12 is substantially uniform.

Heat pipe 12 provides the advantage that no steam separator and no steam dryers are required in reactor vessel 10. In addition, since reactor vessel 10 is closed, i.e., primary coolant remains in vessel 10, there are no main steam lines, no feedwater lines and no isolation valves in communication with vessel 10. Such a construction is much less complex than the constructions of known boiling water nuclear reactors. Further, by eliminating the isolation valves, the potential for leakage is reduced.

Figure 3:
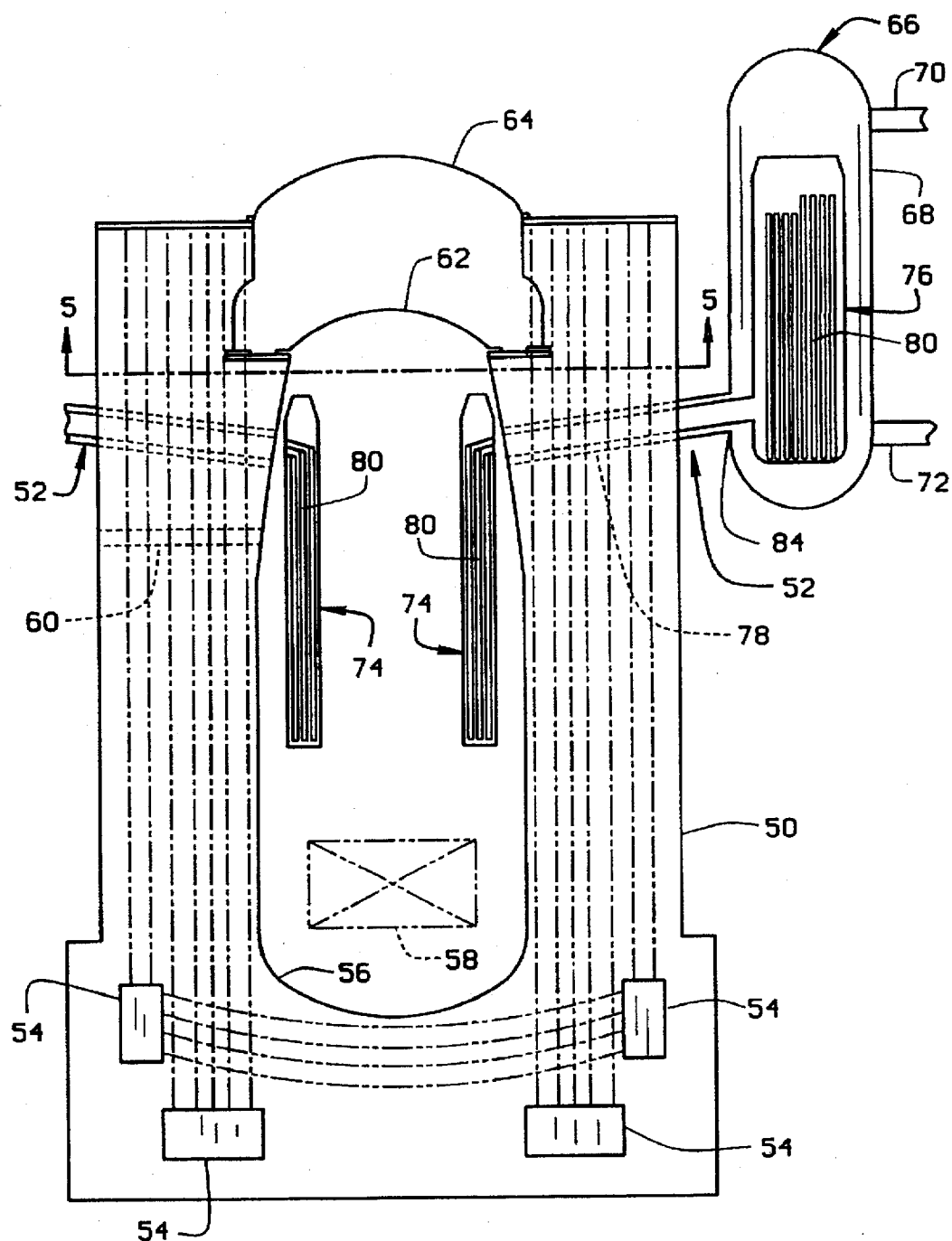
FIG. 3 is a schematic illustration of a nuclear reactor pressure vessel including a heat pipe in accordance with another embodiment of the present invention.

FIG. 3 is a schematic illustration of a nuclear reactor pressure vessel 50 including heat pipes 52 in accordance with another embodiment of the present invention. Reactor vessel 50 is formed from prestressed concrete, and vessel 50 is sometimes referred to herein as prestressed concrete reactor vessel (PCRV). Footings 54 are provided to add extra strength for vessel 50. A steel liner 56 is located within vessel 50 to facilitate maintaining leak-tightness. A core 58 also is located in vessel 50 and is composed of a plurality of fuel rods (not shown). A feedwater line 60 is in flow communication the region enclosed by liner 56.

A reactor pressure vessel head 62 is removably secured to vessel 50 and a containment head 64 is removably secured over reactor pressure vessel head 62. Reactor pressure vessel head 62 and containment head 64 provide the advantage that established refueling and servicing procedures can be used to refuel and service reactor vessel 50.

Steam supply systems 66 which include steam supply vessels 68 (only one steam supply system 66 is shown in FIG. 3) are coupled to heat pipes 52. Steam is output from vessel 68 via a steam outlet 70. The steam from vessel 68 is delivered, for example, to a steam turbine for generating power. Feedwater is supplied to steam supply vessel 68 via a feedwater inlet 72. Although only one steam supply vessel 68 is shown in FIG. 3, it should be understood that other steam supply vessels 68 identical to vessel 68 could be used in connection with reactor pressure vessel 50.

A plurality of heat pipes 52 including evaporator sections 74 positioned in reactor vessel 50, condenser sections 76 positioned in respective steam supply vessels 68, and adiabatic sections 78 extending between and in flow communication with evaporator sections 74 and condenser sections 76 are shown in FIG. 3 (only one condenser section 76 and vessel 68 are shown in FIG. 3) in connection with reactor pressure vessel 50. Evaporator sections 74 and condenser sections 76 are composed of a plurality of tubes 80. Adiabatic sections 78 are identical to adiabatic section 30 shown and described in connection with FIGS. 1 and 2.

Figure 4:
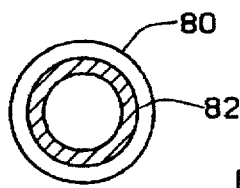
FIG. 4 is a cross-section of an evaporator tube shown in FIG. 3.

FIG. 4 is a cross section illustration of elongate tube 80 used in both evaporator sections 74 and condenser sections 76. As shown in FIG. 4, each tube 80 is lined with a substantially cylindrical wick member 82 so that any condensed fluid flows, by gravity assisted by capillary action of wick member 82, to a lower section of tube 80 when tube 80 is upright.

Figure 5:
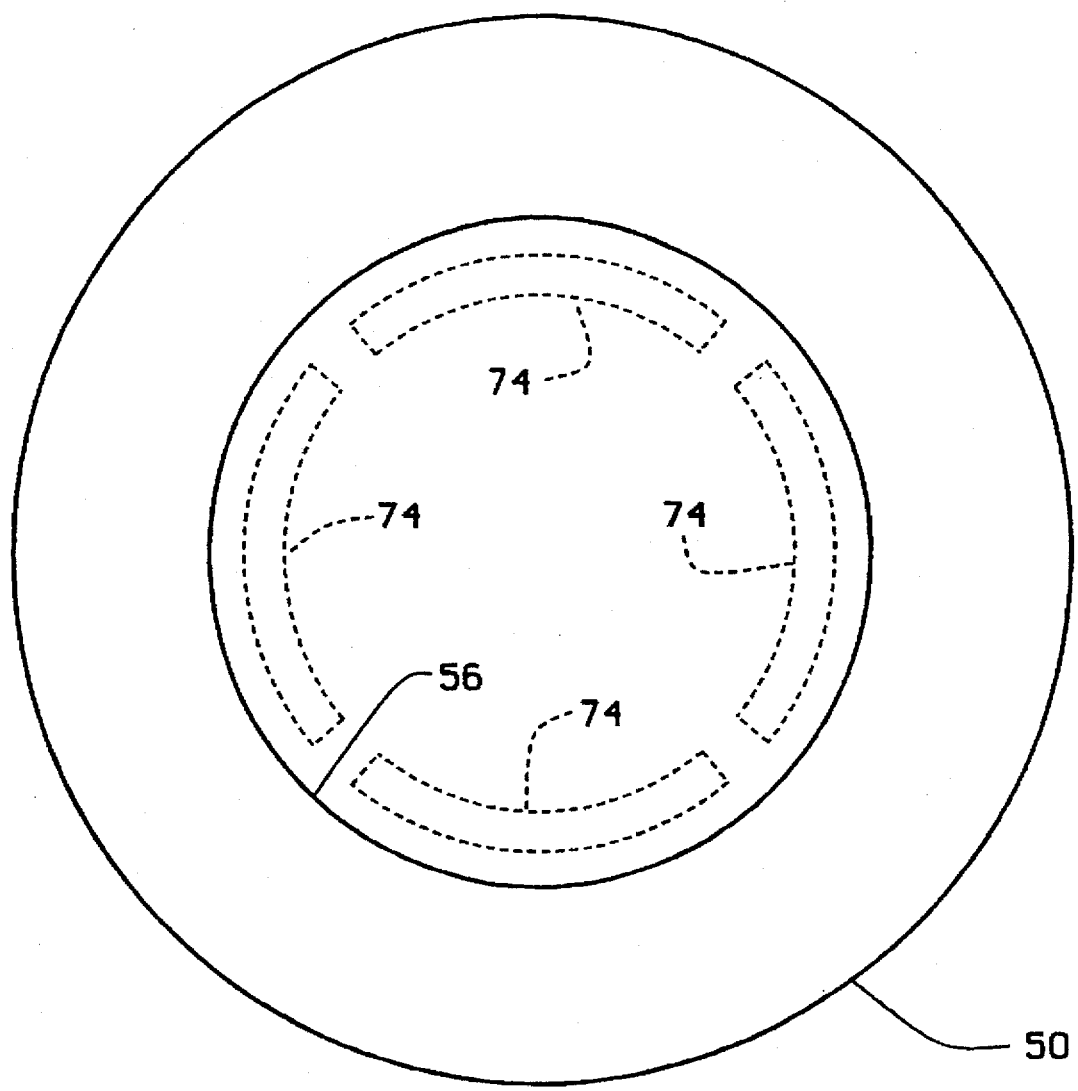
FIG. 5 is a top view of the RPV including evaporator and condenser tubes as shown in FIG. 3.

FIG. 5 is a cross section view through line 5—5 shown in FIG. 3. As shown in FIG. 5, evaporator sections 74 in vessel 50 are arranged in a semi-circle configuration. A plurality of evaporator tubes 80 (not shown separately in FIG. 5) form such sections 74. Each evaporator section 74 may be a part of a separate heat pipe or evaporator sections 74 may be combined to supply vapor to one or two heat pipe adiabatic sections (not shown).

Operation of reactor vessel 50 is substantially similar to operation of reactor vessel 10. More specifically, in reactor vessel 50, heat from reactor core 58 causes the working fluid, e.g., water, in evaporator section 74 of heat pipe 52 to evaporate. The vapor flows through adiabatic section 78 to condenser section 76 in steam supply system 66. The vapor condenses in condenser section 76 and the condensed fluid is transported, by gravity, through adiabatic section 78 to evaporator section 74.

The heat energy transported to condenser section 76 is used to generate steam in steam supply system vessel 68. The generated steam is delivered to, for example, a steam turbine as explained above. Feedwater is supplied to steam supply system vessel 68 via feedwater inlet 72 to replace the removed steam.

Water jacket 84 of heat pipe 52 is filled with water from vessel 68 of steam supply system 66. The temperature in reactor vessel 50 can therefore be controlled by controlling the temperature of the water in steam supply system 66. In addition, the working fluid can be selected so that it boils and condenses at roughly the same temperature so that the temperature along heat pipe 52 is substantially uniform.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A nuclear reactor, comprising:
   a reactor vessel having a plurality of fuel rods positioned therein; and a heat pipe comprising:
   an evaporator section positioned in said reactor vessel;
   a condenser section positioned outside said reactor vessel; and
   an adiabatic section extending between and in communication with said evaporator section and said condenser section, said adiabatic section comprising a substantially cylindrical outer sleeve and a substantially annular wick member positioned within said sleeve, said adiabatic section further comprising a substantially cylindrical inner sleeve positioned within said outer sleeve, an annulus region between said inner sleeve and said outer sleeve, and said wick member, located adjacent an inner wall of said inner sleeve.

2. A nuclear reactor in accordance with claim 1 further comprising a steam supply system comprising a steam supply vessel, said condenser section positioned in said steam supply vessel.

3. A nuclear reactor in accordance with claim 1 wherein said steam supply vessel comprises a feedwater inlet and a steam outlet.

4. A nuclear reactor in accordance with claim 1 wherein said adiabatic section further comprises an insulating layer covering an inner wall of said outer sleeve.

5. A nuclear reactor in accordance with claim 4 further comprising a steam supply system comprising a steam supply vessel, said heat pipe condenser section positioned in said steam supply vessel, said heat pipe annulus region in flow communication with said steam supply vessel.

6. A nuclear reactor in accordance with claim 1 wherein said evaporator section comprises a plurality of elongate tubes having a substantially cylindrical shape, each of said tubes having a substantially cylindrical wick member extending therethrough.

7. A nuclear reactor in accordance with claim 1 wherein said condenser section comprises a plurality of elongate tubes having a substantially cylindrical shape, each of said tubes having a substantially cylindrical wick member extending therethrough.

8. A heat pipe for transferring heat energy from a nuclear reactor vessel to a steam supply system vessel, said heat pipe comprising:
   an evaporator section for being positioned in the reactor vessel;
   a condenser section for being positioned in the steam supply vessel; and
   an adiabatic section extending between and in flow communication with said evaporator section and said condenser section said adiabatic section comprising a substantially cylindrical outer sleeve and a substantially annular wick member positioned within said sleeve, said adiabatic section further comprising a substantially cylindrical inner sleeve positioned within said outer sleeve, an annulus region between said inner sleeve and said outer sleeve, and said wick member located adjacent an inner wall of said inner sleeve.

9. A heat pipe in accordance with claim 8 wherein said adiabatic section further comprises an insulating layer covering an inner wall of said outer sleeve.

10. A heat pipe in accordance with claim 9 wherein said annulus region is positionable for being in flow communication with the steam supply vessel.

11. A heat pipe in accordance with claim 8 wherein said evaporator section comprises a plurality of elongate tubes having a substantially cylindrical shape, each of said tubes having a substantially cylindrical wick member extending therethrough.

12. A heat pipe in accordance with claim 8 wherein said condenser section comprises a plurality of elongate tubes having a substantially cylindrical shape, each of said tubes having a substantially cylindrical wick member extending therethrough.

* * * * *